United States Patent [19]

Kuseski

[11] 4,330,847
[45] May 18, 1982

[54] STORE AND FORWARD TYPE OF TEXT PROCESSING UNIT

[75] Inventor: Roger E. Kuseski, Longmont, Colo.

[73] Assignee: International Business Machines Corporation, Armonk, N.Y.

[21] Appl. No.: 163,673

[22] Filed: Jun. 27, 1980

Related U.S. Application Data

[63] Continuation of Ser. No. 729,460, Oct. 4, 1976, abandoned.

[51] Int. Cl.³ .......................... G06F 3/04; G06F 7/34; H04Q 11/04
[52] U.S. Cl. ........................................ 364/900; 370/61
[58] Field of Search ... 364/200 MS File, 900 MS File; 370/60, 94, 43, 61, 99

[56] References Cited

U.S. PATENT DOCUMENTS

| | | | |
|---|---|---|---|
| 3,281,793 | 10/1966 | Oeters | 364/900 |
| 3,328,764 | 6/1967 | Sorensen | 364/200 |
| 3,673,576 | 6/1972 | Donaldson, Jr. | 364/200 |
| 3,675,209 | 7/1972 | Trost | 364/200 |
| 3,811,014 | 5/1974 | Seitz | 364/200 |
| 3,846,763 | 11/1974 | Riikunen | 364/200 |
| 4,016,548 | 4/1977 | Law | 364/200 |
| 4,017,688 | 4/1977 | Callens | 370/94 |

*Primary Examiner*—James D. Thomas

*Attorney, Agent, or Firm*—Carl M. Wright; H. F. Somermeyer

[57] ABSTRACT

A store and forward unit having an output print station with convenience copying capabilities has connections to diverse text signal sources and destinations. Such diverse sources and destinations may have established textual format and control characters not necessarily shared with other sources and destinations. The store and forward unit, upon receiving a set of text signals, examines the text control characters. Based upon such examination, the store and forward unit processes such text without changing the control characters provided that all destinations connected to such unit can use such control characters. If, on the other hand, the destinations cannot use such control character, the unit adds sufficient control characters for allowing the received text as modified by the additional characters to be transmitted without text processing analysis to any of the connected destinations. If desired, the control characters not usable or not recognized by a receiving destination can be deleted prior to transmission to such destination. Accordingly, when received text is to be retransmitted to a plurality of diverse destinations, the store and forward unit text processes the received text signals but once and supplies the text processed signals to the diverse destinations with only deletions of control characters.

2 Claims, 9 Drawing Figures

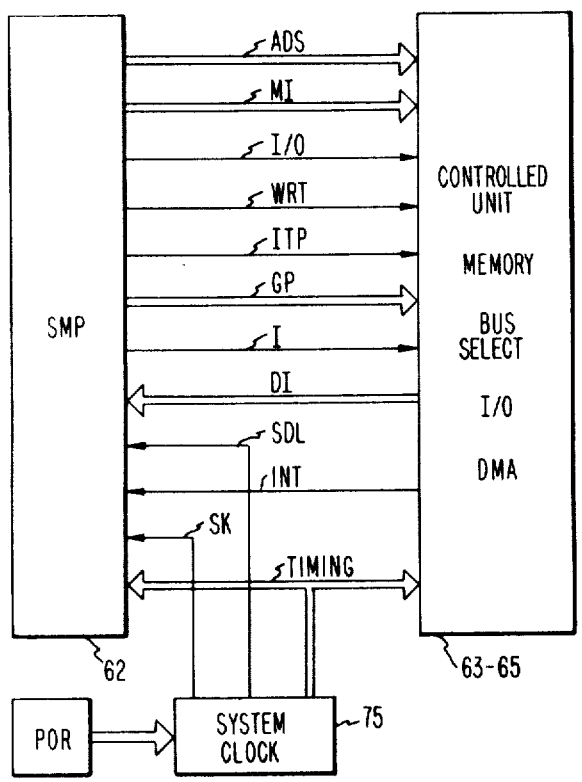
FIG.3A
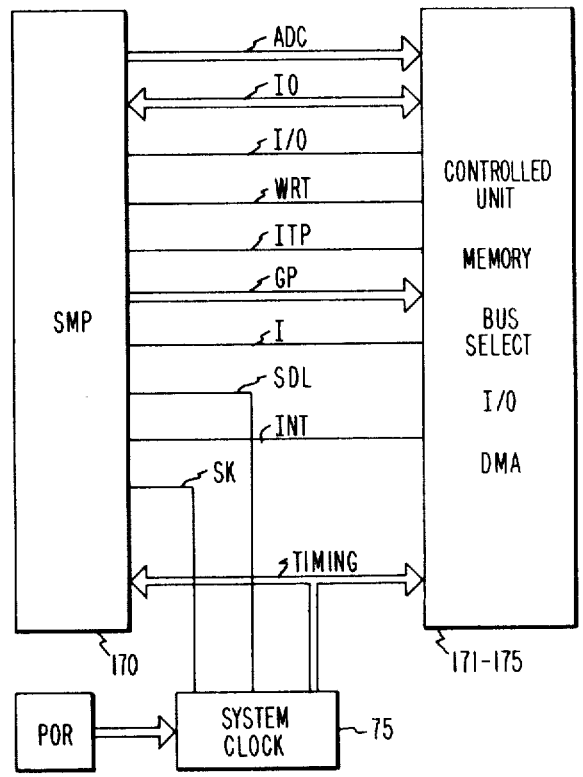
FIG.3B
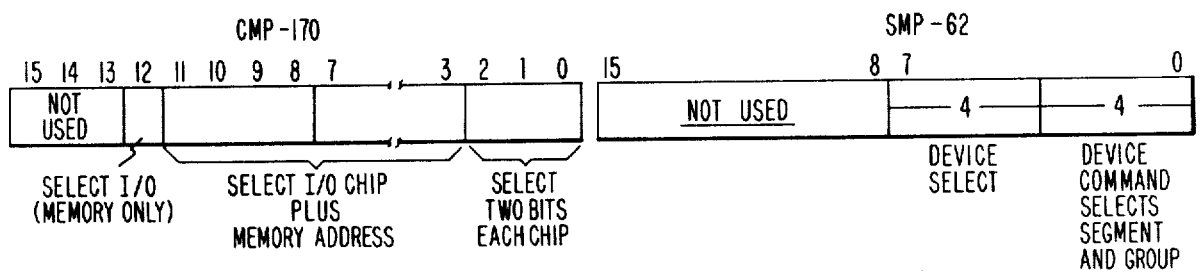
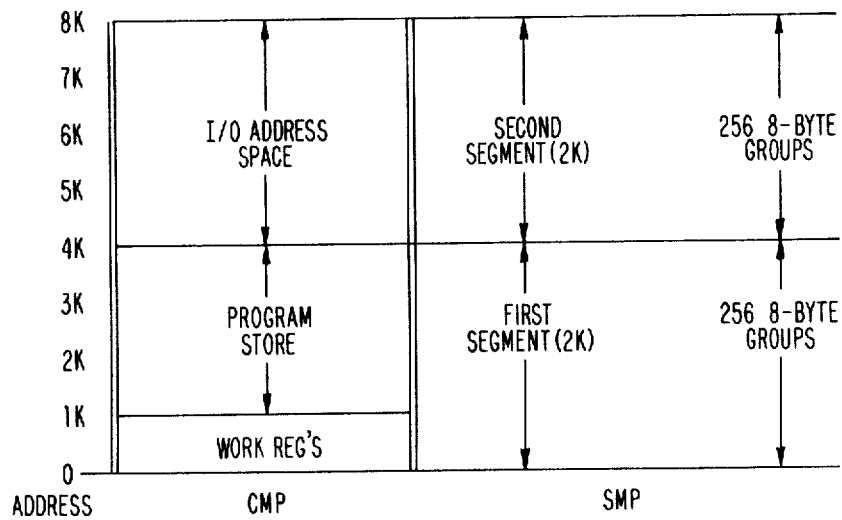
FIG.7

| INSTR | SEQ 1 | | SEQ 2 | | SEQ 3 | | SEQ 4 | | SEQ 5 | | SEQ 6 | |
|---|---|---|---|---|---|---|---|---|---|---|---|---|
| | CL | ALU | CL | ALU | CL | ALU | CL | ALU | CL | ALU | CL | ALU |
| AR SR LR | IBL | M | (TB→IB) IRH | M X | PCI | M NOTE 4 | (TERM) | NOTE 4 | | | | |
| LRE LRD | IBL | M | (TB→IB) IRH | M X | PCI | M NOTE 5 | WRT IRL | NOTE 5 | WRT IRH | TBNS (XX→DB) ACH + DO | (TERM) | TBNS |
| STR | PCI | M | (TB→IB) WRT IRH | X (X→DB) ACH→DO | WRT IRL | ACL→DO | (TERM) | TBNS | | | | |
| AI SI | PCI | M | PCI | M NOTE 1 | (TERM) | NOTE 5 | | | | | | |
| CI GPI LI XI OI NI / CB / AB SB LB XB OB NB | PCI | M | PCI | M ACL x TB ↓ DO ↓ ACL | (TERM) | X | (TERM) | ACL ÷ TB ↓ DO ↓ ACL | | | | |
| STB | PCI | M | TB | M (ACL→DO) | (TB→IB) PCI | X | (TERM) | X | | | | |
| AI SI SHL SHR | PCI | M | WRT TB | M ACL→DO | (TB→IB) PCI | X | | | | | | |
| TRA | PCNI | M | (TB→IB) PCI | M NOTE 2 | (TERM) | NOTE 2 | | | | | | |
| CLA / IC | PCI | M | (TERM) | NOTE 3 | | | | | | | | |
| TBP / TBR | PCI | M CL AC M SET IC | (TERM) | X COT ± EQ | | | | | | | | |
| POR (IJD) | PCI | M | (TERM) | ACL M ↓ DO ↓ ACL | | | IB→"CLA" POR CODE | X RST LOGIC 32→DO | | | | |
| TIME | ø2 220 ø1 | | ø2 | ø1 | ø2 | ø1 | ø2 | ø1 | ø2 | ø1 | ø2 | ø1 |

NOTE 1: ACL ± TB ; + DB → ACH ; ACH → DO → ACL
NOTE 2: ACL MODIF → DB → ACH ; ACH → DO → ACL
NOTE 3: ACL → DB → ACH ; ACH → DO → ACL
NOTE 4: ACL ± TB → DB → ACH ; ACH → DO → ACL
NOTE 5: ACL + Δ → BB → ACH ; ACH → DO → ACL

FIG. 5

| INSTR | SEQ 1 | | SEQ 2 | | SEQ 3 | | SEQ 4 | | SEQ 5 | | SEQ 6 | |
|---|---|---|---|---|---|---|---|---|---|---|---|---|
| | CL | ALU | CL | ALU | CL | ALU | CL | ALU | CL | ALU | CL | ALU |
| AR SR LR | IBL | M | (TB⇒IB) IRH | X | PCI | NOTE 4 | (TERM) | NOTE 4 | | | | |
| LRE LRD | IBL | M | (TB⇒IB) IRH | X | PCI | NOTE 5 | WRT IRL | NOTE 5 | WRT IRH | TBNS (XX→DB) ACH+DO | (TERM) | TBNS |
| STR | PCI | M | (TB⇒IB) WRT IRL | X (X→DB) ACH→DO | WRT IRL | ACL→DO | (TERM) | TBNS | | | | |
| AI SI | PCI | M | PCI | M NOTE 1 | (TERM) | NOTE 5 | | | | | | |
| CI GPI LI XI OI NI / CB AB SB LB XB OB NB | PCI | M | PCI | M ACL × TB DO → ACL | (TERM) | X | | | | | | |
| STB | PCI | M | TB | M (ACL→DO) | (TB⇒IB) PCI | X | (TERM) | ACL ± TB DO → ACL | | | | |
| AI SI SHL SHR | PCI | M | WRT TB | M ACL→DO | (TB⇒IB) PCI | X | (TERM) | X | | | | |
| TRA | PCI | M | (TB⇒IB) PCI | NOTE 2 | (TERM) | NOTE 2 | | | | | | |
| CLA [IC] | PCI | M CL AC SET IC | (TERM) | X COT ⋆ EQ | | | | | | | | |
| TBP [TBR] | PCI | M | (TERM) | ACL M DO ALL | | | | | | | | |
| POR (IJD) | | | | | | | IB→"CLA" POR CODE | X RST LOGIC 32→DO | | | | |

TIME ∅2 220 ∅1 ∅2 ∅1 ∅2 ∅1 ∅2 ∅1 ∅2 ∅1 ∅2

NOTE 1: ACL ± TB + DB → ACH; ACH → DO → ACL
NOTE 2: ACL MODIF → DB → ACH; ACH → DO → ACL
NOTE 3: ACL → DB → ACH; ACH → DO → ACL
NOTE 4: ACL ± TB → DB → ACH; ACH → DO → ACL
NOTE 5: ACL + △ → BB → ACH; ACH → DO → ACL

FIG. 6

STORE AND FORWARD TYPE OF TEXT PROCESSING UNIT

This is a continuation of application Ser. No. 729,460, filed Oct. 4, 1976, now abandoned.

BACKGROUND OF THE INVENTION

The present invention relates to a store and forward unit for handling text type of data signals in a communications environment which can include convenience copying capabilities interleaved with text processing functions and wherein the text processing can be repeated for a plurality of diverse destinations.

Automated editing and text processing is becoming a developed art. Computerization of such text processing is quite popular because of cost-performance considerations. In the past, many of the text processing systems involving a plurality of diverse types of units have used a particular text control code unique to such aggregation of diverse units. Several manufacturers of text processing equipment have developed independent and different noncompatible text control characters, which provide greater facility for their respective apparatus and products, from those provided in other manufacturers' apparatus and products.

With the plurality of different types of text processing apparatus and the advent of enhanced communication systems, the interconnecting diverse types of text processing apparatus and systems having incompatible text control characters becomes highly probable and, in many instances such interconnections are economically desirable. That is, a first text processing system at location A may wish to supply text signals via a communication network to a second text processing system at location B. The two text processing systems may require diverse types of text control characters. If the connection is merely a point-to-point connection, then a single text processing procedure is necessary for conveying the text signals between the two locations. However, in many communication systems, a plurality of such text processing systems can be interconnected in accordance with predetermined switching protocols. A diversity of text characters may be required; therefore, if location A wishes to transmit text signals to four different receiving text processing systems, then the text processing may have to be repeated up to four times. Such repeated text processing on the same text detracts from text processing performance of the transmitting unit.

Other text processing systems may have diverse types of equipment connected thereto, each of which may require different text control characters. For example, a character generator supplying an image via a laser beam to an electrographic copy reproducing unit may require a first set of text processing control characters. A magnetic card automatic typewriter system may require a second set of control characters. A communication link of the Bysync type may require yet a third type of text control characters. Yet further connections to the other apparatus may require yet further sets of text control characters. If a single text is to be transmitted to more than one of such utilization systems, reprocessing the same text for each of the receiving destinations or text processing systems is required. Assuming that it is desired to minimize product cost, then such reprocessing detracts substantially from the performance of the text processing system. Accordingly, it is highly desirable that text processing capabilities be enhanced while minimizing product cost.

BRIEF SUMMARY OF THE INVENTION

It is an object of the present invention to provide a method of operating a store and forward unit of the text processing type wherein reprocessing of the same text destined for a plurality of diverse destinations is unnecessary.

A method in accordance with the present invention contemplates operating a store and forward device for supplying signals to one or more of a plurality of diverse destinations wherein the destinations require diverse signal format. The store and forward device receives data indicating signals along with control signals interleaved with the data indicating signals for indicating functions to be performed with respect to the data indicating signals. The store and forward unit stores the data indicating signals and analyzes the received control signals. Such received control signals are modified by the store and forward unit by substitutions and additions to generate an entirely new set of control signals which includes control functions for all of the plurality of possible destinations. Then the store and forward unit selects a destination and transmits the data indicating signals with the new control signals while deleting ones of the new control signals not usable or recognized by the selected destination with respect to the transmitted data indicating signals.

The foregoing and other objects, features, and advantages of the invention will be apparent from the following more particular description of preferred embodiments of the invention, as illustrated in the accompanying drawings.

BRIEF DESCRIPTION OF THE DRAWING

FIGS. 3A and 3B are block diagrams that indicate the connections between a controlling microprocessor and a controlled device within the FIG. 2 illustrated controller.

FIGS. 5 and 6 are charts showing the instruction repertoire and an execution of computer instructions by the FIG. 4 illustrated microprocessor.

FIG. 7 is an address space diagram illustrating the interactions of the two microprocessors contained within the FIG. 2 illustrated controller.

DETAILED DESCRIPTION

Figure 1:
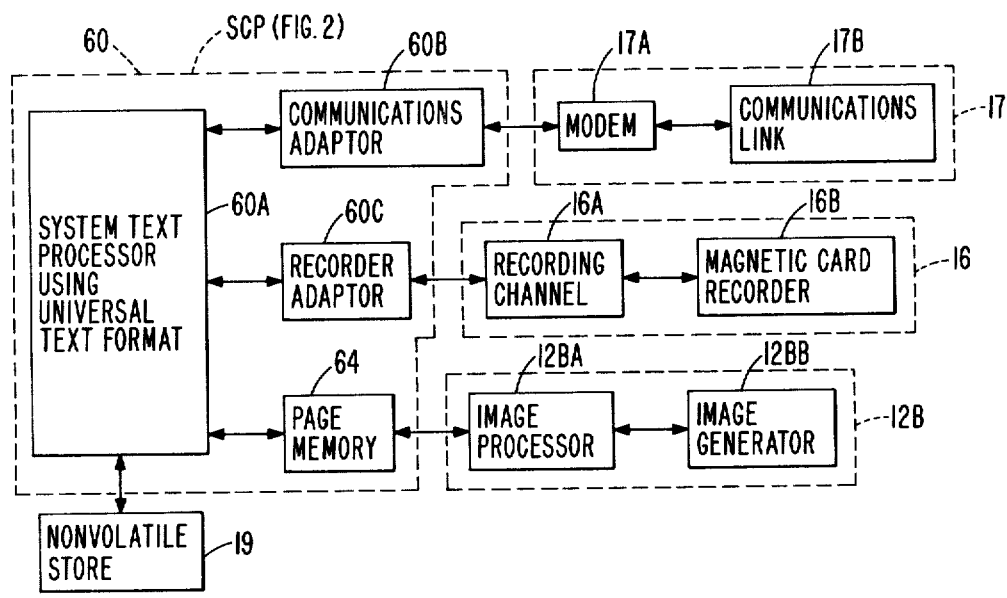
FIG. 1 is a block signal flow diagram of apparatus incorporating the present invention.
Figure 1C:
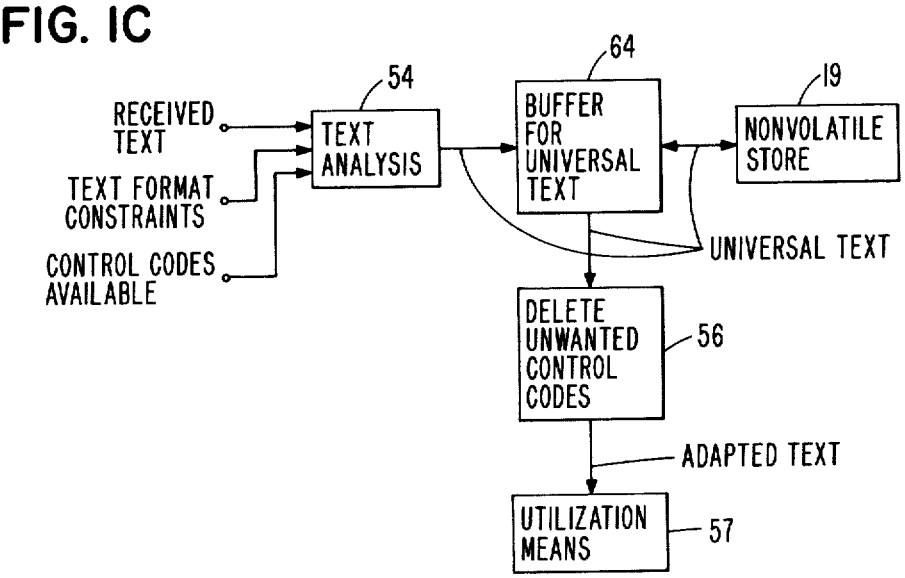
FIG. 1C is a flow diagram illustrating the operation of the FIGS. 1 thru 1B indicated machine for operating on text in accordance with the present invention.

In the drawings, like numerals indicate like parts and structural features. FIG. 1 illustrates apparatus incorporating the present invention. The apparatus is physically embodied in a copy production machine illustrated and described with respect to FIG. 1B. In FIG. 1, a system control processor SCP 60 contains programming utilizing the present invention for adapting the FIG. 1B illustrated copy production machine 10 as a store and forward unit. SCP 60 includes a system text processor using a universal text format 60A plus a communications adaptor 60B which, under program control, connects a remote terminal connector RTC 17 with unit 60. RTC 17 includes a modem 17A and a communications link 17B for communications with other units (not shown). Additionally, unit 60 includes recorder adapter 60C for connecting unit 60 to a local terminal LT 16, which may be a magnetic card automatic typewriter such as that manufactured by the International Business Machines Corporation, Armonk, N.Y. LT 16 includes a recording channel 16A connected with a magnetic card reader/recorder 16B. Further, unit 60 includes a page memory 64, a semiconductor random access memory. Memory 64 is connected not only to the processor 60A but also to an image generator 12B for imposing images on a photoconductor drum later described with respect to FIG. 1B. Unit 12B includes an image processor 12BA and an image generator 12BB. Image processor 12BA receives image indicating signals from page memory 64 and converts them into a form for use by the image generator generating an optical image to be produced.

Image indicating signals of the text type can be received from either RTC 17 or LT 16. RTC 17 and LT 16 each have their own unique set of control codes which are not compatible with each other. The received image indicating signals and control codes are processed through the adapter 60B or 60C to system text processor 60A. System text processor 60A, in accordance with the present invention, analyzes the control code characters and modifies them to use the new modified code with any of the plurality of possible text destinations. Such text processed image indicating signals are stored in page memory 64 for use by laser input 12B and as a working memory in conjunction with system text processor 60A. If the text processed signals are to be retained for later transmission, such text processed signals are transferred from page memory 64 to nonvolatile store 19. From nonvolatile store 19 system text processor 60A can fetch the stored signals for retransmission to any of the illustrated links 17, 16 or 12B. In such a transmission system, the text processor 60A does not reprocess the text signals. Rather, it only analyzes the control characters for deleting unwanted characters while simultaneously converting the code characters from one code to another, i.e., from an internal code to a EBCDIC code, for example.

Figure 1A:
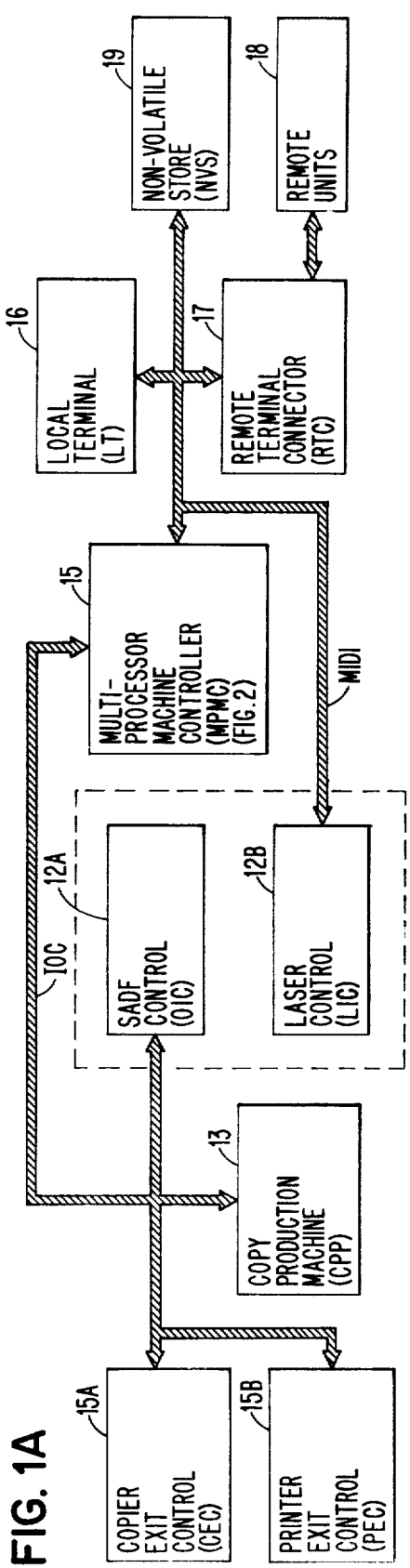
FIG. 1A is a block diagram of a control system for operating the FIG. 1 illustrated machine.
Figure 1B:
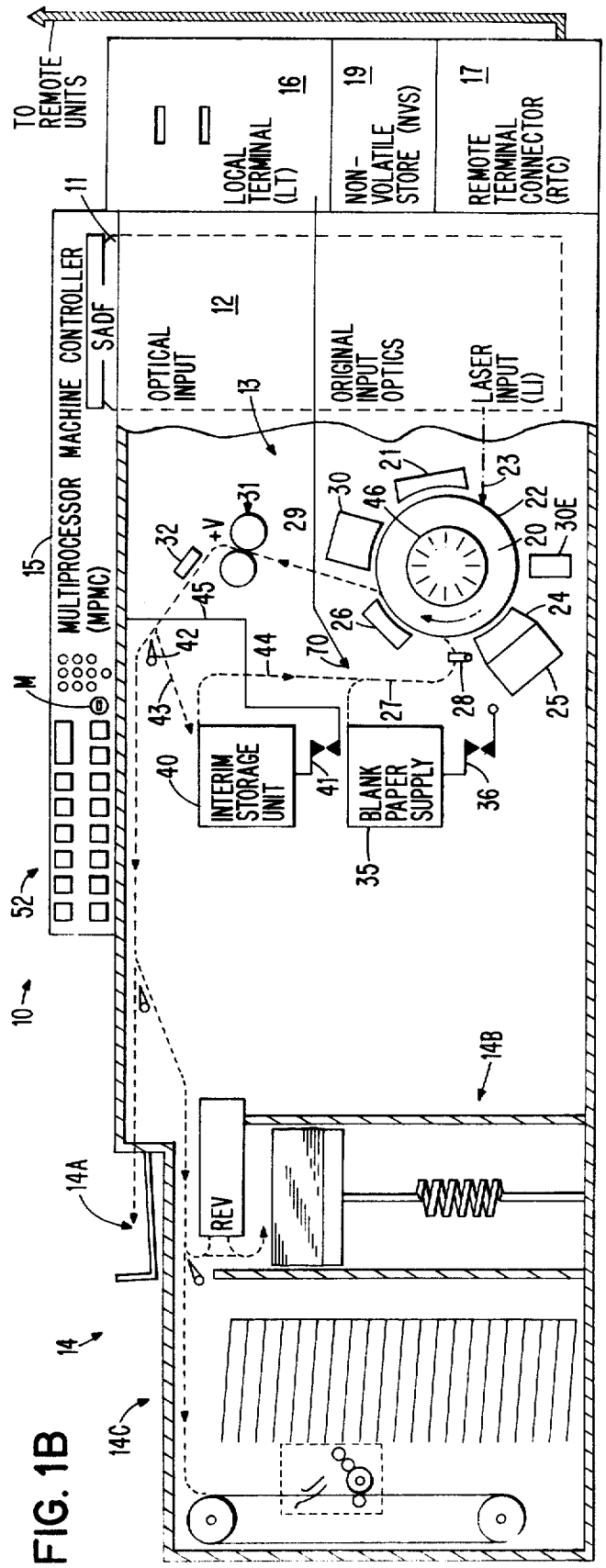
FIG. 1B is a diagrammatic showing of a constructed machine using the arrangement shown in FIG. 1.
Figure 2:
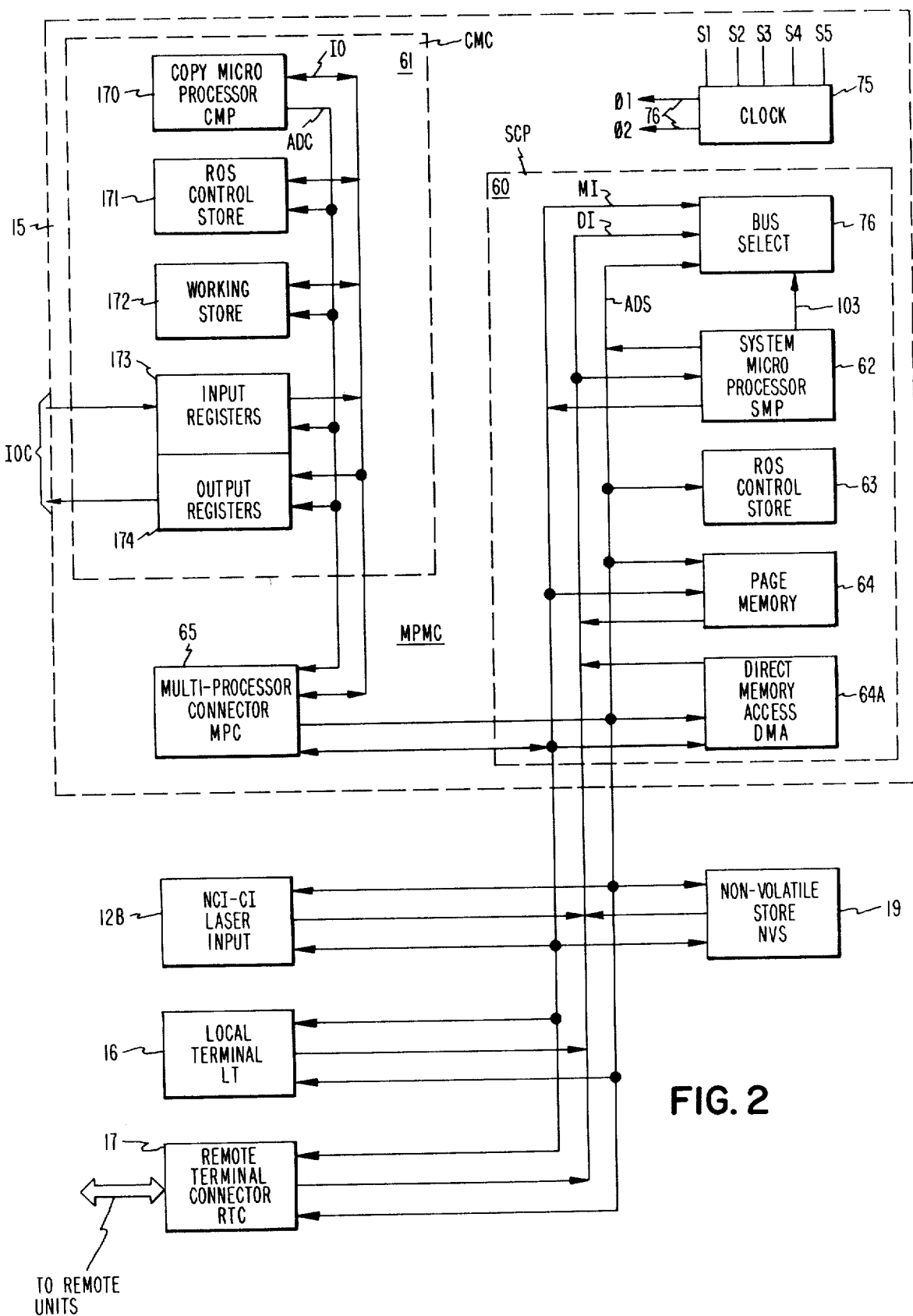
FIG. 2 is a block signal flow diagram of a system controller usable with the FIG. 1A illustrated control system.
Figure 4:
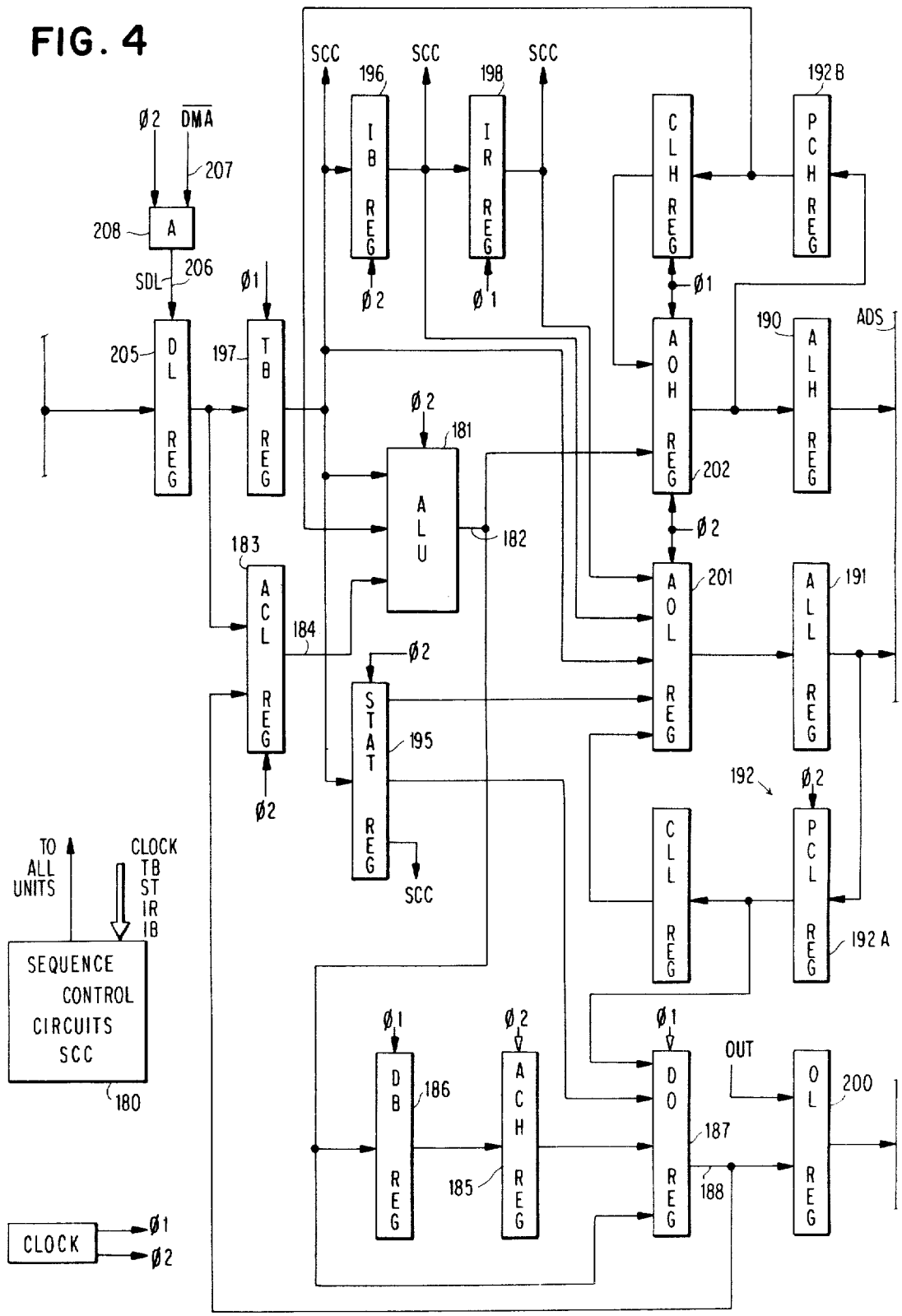
FIG. 4 is a block and signal flow diagram of a microprocessor usable in the FIG. 2 illustrated controller.
Figure 8:
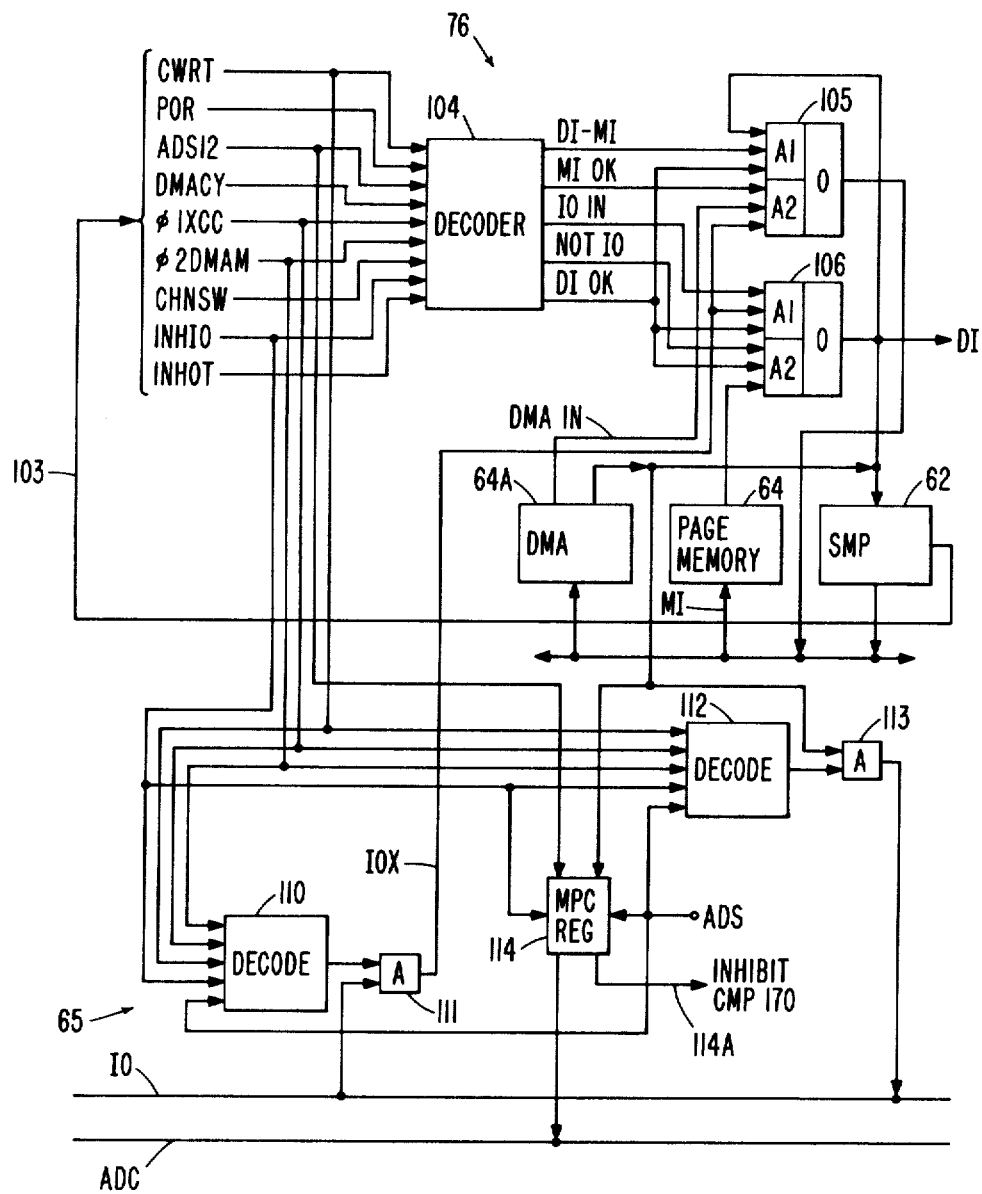
FIG. 8 is a schematic diagram of apparatus for logically interconnecting data signal transfer busses used in the FIG. 2 illustrated controller.

FIGS. 1A and 1B respectively show a copy production machine 10 constructed using the principles of the present invention and which may be advantageously employed in the FIG. 1 illustrated image communication network. The copy production machine centers around a copy production portion CPP 3. CPP 13 is illustrated in FIG. 1B as a transfer electrographic copy production portion although no limitation thereto is intended. A plurality of image inputs are provided to CPP 13. Such inputs, selectively denoted by numeral 12, include a document scanning optical input in optical communication with a semiautomatic document feed SADF 11. SADF 11 includes a document glass on which an original document may be placed either manually by lifting a SADF lid (not shown), or via semiautomatic document feed from input tray 11A. The optical image from SADF 11 is transmitted to CPP 13 using known optical techniques commonly found in convenience copiers of several types. Additionally, original input optics 12 include a laser input LI which receives word processing indicating signals for creating an optical image as an image input to CPP 13 via common input 23. The original input optics 12 include a SADF control OIC 12A as well as a laser input control 12B (FIG. 1A).

The laser input can receive signals from a local terminal LT 16 (FIG. 1B) which is a word processing terminal for receiving word processing signal bearing magnetic cards at input slot 16A and for ejecting such cards at output slot 16B. Signals from LT 16 are temporarily stored in nonvolatile store NVS 19. Additionally, for communication in an image communication network as shown in FIG. 1, a remote terminal connector RTC 17 provides signal communication to various remote units, collectively denoted by numeral 18. In FIG. 1A, the numeral 18 indicates the remainder of the network as shown in FIG. 1. The word processing signals from LT 16 or RTC 17 are initially stored in NVS 19. From NVS 19, multiprocessor machine controller MPMC 15 effects transfer of the signals to LIC 12B (FIG. 1A) for generating an image to be transferred to CPP 13, as will become more readily apparent. In one embodiment, print jobs received by RTC 17 and LT 16 are alternated. A priority scheme could be employed if desired.

Copy production machine 10 also includes a copy output portion 14 having a plurality of copy receiving units. When laser input L1 12 supplies images to CPP 13, the copies produced are directed toward output portion 14B as will be later more fully described. When SADF 11 is used as an input to optics 12, the copy production machine 10 is in what is termed a copy mode wherein the copies produced by CPP 13 are directed either to copy exit tray 14A or to copy collator 14C. The output unit 14B in a constructed embodiment was reserved for copies produced in the print mode.

MPMC 15 controls all units in copy production machine 10. The various closely controlled units such as LIC 12B, NVS 19, RTC 17, and LT 16 are controlled by a pair of later described unidirectional busses collectively denoted by MIDI in FIG. 1A. The other units are those related to copy production and which are supervised by MPMC 15. Communication is by a bidirectional data bus IOC shown connected to the copier exit control CEC 15A, printer exit control PEC 15B, CPP 13, SADF control 12A. The interactions of the various units of copy production machine 10 will become apparent from a continued reading.

A description of the operation of the document reproduction mechanism 13 (FIG. 1B) is included in U.S. Pat. No. 4,086,658 (same assignee as this case) from column 3, line 58, to column 5, line 27, incorporated herein by reference.

The operation of the above-described machine when practicing the present invention is illustrated in the FIG. 1C flow chart. Details of such operations follow with a more detailed description of the computer portion of the copy production machine 10. The FIG. 1C flow chart illustrates the operation of the system text processor 60A. Received text from either of the text sources 16 or 17 (FIG. 1) is first subjected to a text analysis at step 54. Imposed upon such analysis are text format constraints programmed into system text processor 60A. Such constraints are typically generated by the respective sources 16, 17 through an operator control language (OCL) transmitted with the data indicating control signals as an initial set up card or set of signals. Such text format constraints include margins, tabulation settings, font selection, all as normally used in text processing. Further included in the text analysis is a comparison of the received control characters from sources 16, 17 with the control codes available. This is a table look-up operation in that all of the legal codes receivable from sources 16, 17 are indexed to all of the codes usable in the entire FIG. 1 illustrated system. System text processor 60A, using a computer program, adds, substitutes, or otherwise modifies the received control characters in accordance with the format constraints and the control codes available. An example of such modifications is set forth in Table I below for use with the illustrated FIG. 1 machine for selected control characters, it being understood that other control characters will be subjected to other types of text processing functions similar to those illustrated in Table I.

| Legend for Table I | |
|---|---|
| FHI | Forward Half Index |
| RHI | Reverse Half Index |
| CHI | Change Half Index |
| RHT | Required Horizontal Tab |
| NL | New Line |
| PDLM | Print Delimiter |
| SP | Space |
| VT | Vertical Tab |
| EMF | End Margin Fill |
| EOR | End of Row |
| RFF | Required Forms Feed |
| EOP | End of Page |
| HT | Horizontal Tab |
| SOF | Start of Format |
| $D_n$ | Data or Control Information |
| LF | Line Feed |
| SCT | Special Control Text |
| $?_n$ | Unknown (Random) Memory | resented in the second column is a conversion from the input text insofar as text characters are concerned to an internal code. If, for example, the universal text was then returned to the RTC 17 for retransmission to a remote unit the text coding would be changed. This action is a direct substitution, well known in text processing. For using RTC 17 as a destination, the control characters of the universal text, FHI CHI, comparing with FHI would result in deletion of CHI while the second control character RHI CHI would result in transmission of only RHI. If the text corresponding with those control characters were transmitted to diverse destination 12B, the control characters would be CHI in both instances. If the text would be sent to LT 16 the control characters would be converted to FHI and PHI, also again by deletion. The other control characters using known input text formats are converted as shown to the various adapted text.

From the text analysis the universal formatted text signals are stored in page memory 64 which serves as a buffer for the universal text. From buffer or page memory 64 the universal text is transmitted via system text processor 60A with the unwanted control codes being deleted at step 56. The deletion of the unwanted control codes results in the adapted text being sent to utilization means which includes, of course, the three connections 12B, 16 and 17. Further, if the universal text is to be transmitted to additional destinations, the universal text is stored in nonvolatile store NVS 19 for later retrieval.

Before describing the computer programming for effecting such efficient text processing, the system hardware in which the programming resides is first described for a better understanding of programmed function and operations.

A description of the MPMC 15 and a microprocessor suitable for executing the program according to the present invention is included in U.S. Pat. No. 4,086,658, supra, from column 6, line 21 to column 25, line 11, incorporated herein by reference.

A MICROCODE IMPLEMENTATION OF THE INVENTION

It is preferred that the above-described computer be

TABLE I
CONTROL CODE EXAMPLES
($\alpha$ = Text Characters)

| Input Text | Universal Text | Printer Text | Word Processing Text |
|---|---|---|---|
| $\alpha$ FHI $\alpha$ RHI | $\alpha$ FHI CHI $\alpha$ RHI CHI $\alpha$ | $\alpha$ CHI $\alpha$ CHI $\alpha$ | $\alpha$ FHI RHI $\alpha$ |
| $\alpha$ RHT $\alpha$ NL $\alpha$ | $\alpha$ RHT PDLM SP SP SP PDLM $\alpha$ NL VT SP SP SP SP SP EMF $\alpha$ | $\alpha$ SP SP SP $\alpha$ EOR SP SP SP SP SP $\alpha$ | $\alpha$ RHT $\alpha$ NL $\alpha$ |
| $\alpha$ RFF $\alpha$ | $\alpha$ RFF $\alpha$ | $\alpha$ EOP $\alpha$ | $\alpha$ RFF $\alpha$ |
| $\alpha$ HT $\alpha$ | SOF 66 3 $D_1$ $D_2$ $D_3$ $\alpha$ HT PDLM SP SP PDLM $\alpha$ SOF 87 2 $D_1$ $D_2$ $\alpha$ | $\alpha$ SP SP $\alpha$ | SOF 66 3 $D_1$ $D_2$ $D_3$ $\alpha$ HT $\alpha$ SOF 87 2 $D_1$ $D_2$ $\alpha$ |
| $\alpha$ LF $\alpha$ | $\alpha$LF VT SP SP SP SP SP SP SP EMF $\alpha$ | $\alpha$ EOR SP SP SP SP SP SP $\alpha$ | $\alpha$ LF $\alpha$ |
| $\alpha$ NL $\alpha$ | $\alpha$ NL SCT 31 $?_1$ $?_2$ $?_3$ ... $?_{30}$ $?_{31}$ $\alpha$ | $\alpha$ SP SP SP ... SP SP $\alpha$ | $\alpha$NL $\alpha$ |
| $\alpha$ HT $\alpha$ NL $\alpha$ | SOF 23 $\phi$ VT SP SP SP EMF $\alpha$ HT PDLM SP SP SP SP PDLM $\alpha$ SOF 16 2 $D_1$ $D_2$ NL SCT 5 $?_1$ $?_2$ $?_3$ $?_4$ $?_5$ VT SP SP SP EMF $\alpha$ | SP SP SP $\alpha$ SP SP SP SP $\alpha$ ECT SP SP SP $\alpha$ | SOF 23 $\phi$ $\alpha$ HT $\alpha$ SOF 1 2 $D_1$ $D_2$ NL $\alpha$ |

In the above Table I, the left hand column indicates input text as received via input RTC 17. The alphabetic characters represent control characters usable with Bysync communications. The Greek alpha character represents interleaved text characters, the coding of which is not pertinent to the practice of the present invention. As a practical matter, the universal text repmicroprogrammed to implement the present invention. The source code instructions related to the above-described computer are set forth below for implementing major portions of the Table I examples. Of course, in a practical machine, code would be included for a greater number of control characters which follow the teachings set forth below. The code is arranged based on the universal text column.

means instruction operation definition, OP1 and OP2 are operands and SOURCE STATEMENT is comment on the coding.

TABLE II
HT OR RHT MICROCODE SOURCE CODE

| LOC | OBJ | OP1 | OP2 | | SOURCE STATEMENT | | |
|---|---|---|---|---|---|---|---|
| | | | | C | | | ..... PROCESS PUTST BUMPS ACTIVE OUTPUT BFR PTR |
| | | | | | PUTST | ACOUTBFR | |
| | | | | | | | ..... IF LINE NUMBERING SET |
| 633E | A677 | 0277 | | | LBL | ERR2B | |
| 6340 | 95 | 0005 | | | TP | NUMLNRF | |
| 6341 | 45 | 6345 | | | JE | STRRORQ | |
| | | | | | | | ..... THEN |
| | | | | C | | | ...... LOAD A TAB CODE IN OUTPUT BFR |
| | | | | C | | | (IF RECORDED & REQ'D TAB |
| | | | | C | | | RECORDED, THEN LNE # ON |
| | | | | C | | | NXT LNE WOULD BE |
| | | | | C | | | INDENTED) |
| 6342 | AEEC | 00EC | | | LI | #HT | |
| 6344 | 06 | 6346 | | | J | *+2 | |
| | | | | | | | ..... ELSE |
| | | | | | | | ...... LOAD CHAR(HT OR RHT) IN OUTPUT BFR |
| 6345 | 9C | 000C | | C STRRORQ | LN | ACINBFR | |
| 6346 | BD | 000D | | | STN | ACOUTBFR | |
| | | | | | | | ..... ENDIF |
| | | | | | | | ..... BUMP ACTIVE OUTPUT BFR PTR |
| 6347 | FD | 000D | | | LRB | ACOUTBFR | |
| | | | | C | | | ..... IF ACTIVE OUTPUT BFR PTR > OR = END ADDR +1 OF OUTPUT BFR |
| | | | | C | | | (> CHECK MADE IN CASE OF |
| | | | | C | | | OVERRUN OF MARGIN TEXT BFR) |
| 6348 | E4 | 0004 | | | LR | OTENDBFR | |
| 6349 | CD | 000D | | | SR | ACOUTBFR | |
| 634A | 3F4F | 634F | | | BH | *+5 | |
| | | | | | | | ..... THEN |
| | | | | C | | | ...... CALL OVERRUN TAKES CARE OF ANY BFR OVERRUN CONDITIONS |
| 634C | 30685E | 0000 | 5E68 | | BAL | TEMPSVCR,OVERRUN | |
| | | | | | | | ..... ENDIF |
| | | | | | | | ..... LOAD PRINT ONLY DELIMITER |
| 634F | AEE4 | 00E4 | | | LI | #PDLM | |
| 6351 | BD | 000D | | | STN | ACOUTBFR | |
| | | | | | SRG | GROUPTL | |
| 6352 | A9D6 | 00D6 | | | | | |
| | | | | C | | | ..... CALL SPINS INSERTS SPACES UP TO TAB STOP |
| 6354 | 33E547 | 0003 | 47E5 | | BAL | TEMPSCAR, SPINS | |
| | | | | | | | ..... BUMP ACTIVE OUTPUT BFR PTR |
| | | | | | SRG | GROUPTV | |
| 6357 | A9D7 | 00D7 | | | | | |
| 6359 | FD | 000D | | | LRB | ACOUTBFR | |
| | | | | C | | | ..... IF ACTIVE OUTPUT BFR PTR > OR = END ADDR +1 OF OUTPUT BFR |
| 635A | E4 | 0004 | | | LR | OTENDBFR | |
| 635B | CD | 000D | | | SR | ACOUTBFR | |
| 635C | 3E61 | 6361 | | | BH | *+5 | |
| | | | | | | | ..... THEN |
| | | | | C | | | ...... CALL OVERRUN TAKES CARE OF ANY BFR OVERRUN CONDITIONS |
| 635E | 30685E | 0000 | 5E68 | | BAL | TEMPSVCR. OVERRUN | |
| | | | | | | | ..... ENDIF |
| | | | | C | | | ..... LOAD PRINT ONLY DELIMITER IN OUTPUT BFR |
| 6361 | AEE4 | 00E4 | | | LI | #PDLM | |
| 6363 | BD | 000D | | | STN | ACOUTBFR | |

The computer microcode is not organized such that each example is contained in but a single microcode subroutine. Decoding the control character in the input text column results in calling microcode routines having embedded universal text control characters or symbols, i.e., such universal characters are embedded as constants within the called microcode microcode routine.

The "HT" or "RHT" control characters of Universal Text are handled by the microcode set forth in Table II and called by input text character decoding RHT or HT. In all the tables LOC means memory location, OBJ In Table II above, the Branch and Link instruction, BAL, at 6354 and object coded 33E547 calls a microcode subroutine not detailed herein by source code. The Table II source code for a tabulate function puts the first and last space in the tabulate movement. The called microcode subroutine "SPINS" is an interactive loop which adds the intermediate space symbols. For example, if a tabulate is for eight spaces, then the SPIN subroutine has six iterations to add six space symbols to the first and last space symbol added by the Table II illustrated source code. Since interactive loops are well known, that code listing is dispensed with.

LI 12B, as constructed, has no tabulate function. Accordingly, to achieve a tabulate function, space symbols equalling the tabulate distance are added to the text. In supplying such text to LT 16, the space symbols are deleted.

The Universal Symbol PDLM has a similar symbol RDLM. PDLM pertains to LI 12B while RDLM pertains to LT 16. Both actuate the respective units to effect similar results. In Table III below, the RDLM source code is shown, it being understood the complementary source code is used for PDLM. Table III also includes the SOF microcode.

TABLE III

SOF, RPDM SOURCE CODE

| LOC | OBJ | OP1 | OP2 | | SOURCE STATEMENT | | |
|---|---|---|---|---|---|---|---|
| | | | | | | | . THEN |
| | | | | | | | . . PROCESS PUTST BUMPS ACTIVE OUTPUT BFR PTR |
| | | | | C | | | |
| | | | | | PUTST | ACOUTBFR | |
| | | | | | | | . . STORE RECORD DELIMITER IN OUTPUT BFR |
| 4A0A | AEE5 | 00E5 | | | LI | #RDLM | |
| 4A0C | BD | 000D | | | STN | ACOUTBFR | |
| | | | | | | | . ENDIF |
| | | | | | | | . PROCESS PUTST BUMPS ACTIVE OUTPUT BFR BFR PTR |
| | | | | C | | | |
| | | | | NOPUT | PUTST | ACOUTBFR | |
| | | | | | | | . LOAD SOF CODE IN OUTPUT BFR |
| 4A13 | AEE7 | 00E7 | | | LI | #SOF | |
| 4A15 | BD | 000D | | | STN | ACOUTBFR | |
| | | | | | | | . PROCESS PUTST BUMPS ACTIVE OUTPUT BFR PTR |
| | | | | C | | | |
| | | | | | PUTST | ACOUTBFR | |
| | | | | | | | . LOAD SOF # INTO OUTPUT BFR |
| 4A1C | 9C | 000C | | | LN | ACINBFR | |
| 4A1D | BD | 000D | | | STN | ACOUTBFR | |
| | | | | | | | . PROCESS FETCHST BUMPS ACTIVE INPUT BFR PTR |
| | | | | C | | | |
| | | | | | FETCHST | ACINBFR | |
| | | | | | | | . PROCESS PUTST BUMPS ACTIVE OUTPUT BFR PTR |
| | | | | C | | | |
| | | | | | PUTST | ACOUTBFR | |
| | | | | | | | . LOAD # OF BYTES IN SOF SEQ INTO OUTPUT BFR & INTO TEMP CNTR (TPTEMP1B) & INTO TEMP LENGTH BYTE (OTMPB) |
| | | | | C | | | |
| | | | | C | | | |
| 4A2A | 9C | 000C | | | LN | ACINBFR | |
| 4A2B | A182 | 0282 | | | STBL | TPTEMP1B | |
| 4A2D | A1C1 | 02C1 | | | STBL | OTMPB | |
| 4A2F | BD | 000D | | | STN | ACOUTBFR | |
| | | | | | | | . WHILE TEMP COUNT BYTE NOT 0 |
| | | | | | | | . DO |
| 4A30 | A800 | 0000 | | LOADSOF | CI | ZERO | |
| 4A32 | 3D49 | 4A49 | | | BE | THRU | |
| | | | | | | | . . PROCESS FETCHST BUMPS ACTIVE INPUT BFR PTR |
| | | | | C | | | |
| | | | | | FETCHST | ACINBFR | |
| | | | | | | | . . PROCESS PUTST BUMPS ACTIVE OUTPUT BFR PTR |
| | | | | C | | | |
| | | | | | PUTST | ACOUTBFR | |
| | | | | | | | . . STORE CHAR INTO OUTPUT BUFR |
| 4A40 | 9C | 000C | | | LN | ACINBFR | |
| 4A41 | BD | 000D | | | STN | ACOUTBFR | |
| | | | | | | | . . DECREMENT TEMP COUNT BYTE |
| 4A42 | A682 | 0282 | | | LBL | TPTEMP1B | |
| 4A44 | 2A | | | | S1 | | |
| 4A45 | A182 | 0282 | | | STBL | TPTEMP1B | |
| 4A47 | 2C30 | 4A30 | | | B | LOADSOF | |
| | | | | | | | . ENDWHILE |
| | | | | | | | . IF ACTIVE INPUT BFR NOT PAGE BFR |
| 4A49 | A6BB | 02BB | | THRU | LBL | IOPORTB | |
| 4A4B | 96 | 0006 | | | TP | BIT6 | |
| 4A4C | 66 | 4A56 | | | JNE | ENDSKIP1 | |
| | | | | | | | . THEN |
| | | | | | | | . . PROCESS PUTST BUMPS ACTIVE OUTPUT BFR PTR |
| | | | | C | | | |
| | | | | | PUTST | ACOUTBFR | |
| | | | | | | | . . STORE RECORD DELIMITER IN OUTPUT BFR |
| 4A53 | AEE5 | 00E5 | | | LI | #RDLM | |
| 4A55 | BD | 000D | | | STN | ACOUTBFR | |

TABLE IV

LINE FEED SOURCE CODE

| LOC | OBJ | OP1 OP2 | SOURCE STATEMENT |
|---|---|---|---|
| 5BA7 | 9C | 000C | LN ACINBFR |

TABLE IV-continued

LINE FEED SOURCE CODE

| LOC | OBJ | OP1 | OP2 | SOURCE STATEMENT | | | |
|---|---|---|---|---|---|---|---|
| 5BA8 | 3EAC | 5BAC | | | BH | NOTENDPG | |
| | | | | | | . THEN | |
| | | | | | | .. LOAD | NL CODE IN OUTPUT BFR (THIS PREVENTS FRST LINE OF POSSIBLE FOOTER OR HEADER ON NXT PAGE FROM PLAYING OUT STRTING AT INDEX'S ESC WHEN RECORDED) |
| | | | | C | | | |
| | | | | C | | | |
| | | | | C | | | |
| | | | | C | | | |
| 5BAA | AEE5 | 00E5 | | LOADNL | LI | #NL | |
| | | | | | | . ELSE | |
| | | | | | | .. LOAD | LF CODE IN OUTPUT BFR |
| 5BAC | BD | 000D | | NOTENDPG | STN | ACOUTBFR | |

TABLE V

EMF SOURCE CODE

| LOC | OBJ | OP1 | OP2 | SOURCE STATEMENT | | | |
|---|---|---|---|---|---|---|---|
| 68D1 | FD | 000D | | MOVEST1 | LRB | ACOUTBFR | |
| | | | | | | .. IF | ACTIVE OUTPUT BFR PTR > OR = END ADDR +1 OF OUTPUT BFR (> CHECK MADE IN CASE OF OVERRUN OF MARGIN TXT BFR |
| | | | | C | | | |
| | | | | C | | | |
| | | | | C | | | |
| 68D2 | F4 | 0004 | | | LR | OTENDBFR | |
| 68D3 | CD | 000D | | | SR | ACOUTBFR | |
| 68D4 | 3ED9 | 68D9 | | | BH | *+5 | |
| | | | | | | .. THEN | |
| | | | | | | ... CALL | OVERRUN TAKES CARE OF ANY BFR OVERRUN CONDITIONS |
| | | | | C | | | |
| 68D6 | 30685E | 0000 | 5E68 | | BAL | TEMPSVCR,OVERRUN | |
| | | | | | | .. ENDIF | |
| | | | | | | .. STORE | EMF CODE (END OF SEQ TO BE PRINTED BUT NOT RECORDED OR TRANSMIT TED) IN OUTPUT BFR |
| | | | | C | | | |
| | | | | C | | | |
| 68D9 | AEFE | 00FE | | | LI | #EMF | |
| 68D8 | BD | 000D | | | STN | ACOUTBFR | |

TABLE VI

VT SOURCE CODE

| LOC | OBJ | OP1 | OP2 | SOURCE STATEMENT | | | |
|---|---|---|---|---|---|---|---|
| | | | | | | ... THEN | |
| | | | | | | .... BUMP | OUTPUT BFR PTR |
| 6884 | FD | 000D | | | LRB | ACOUTBFR | |
| | | | | | | .... IF | ACTIVE OUTPUT BFR PTR > OR = END ADDR +1 OF OUTPUT BFR (> CHECK MADE IN CASE OF OVERRUN OF MARGIN TXT BFR) |
| | | | | C | | | |
| | | | | C | | | |
| | | | | C | | | |
| 6885 | E4 | 0004 | | | LR | OTENDBFR | |
| 6886 | CD | 000D | | | SR | ACOUTBFR | |
| 6887 | 3E8C | 688C | | | BH | *+5 | |
| | | | | | | .... THEN | |
| | | | | | | .... CALL | OVERRUN TAKES CARE OF ANY BFR OVERRUN CONDITIONS |
| | | | | C | | | |
| 6889 | 30685E | 0000 | 5E68 | | BAL | TEMPSVCR,OVERRUN | |
| | | | | | | .... ENDIF | |
| | | | | | | .... STORE | VT CODE (STRT OF SEQ TO BE PRINTED BUT NOT RECORDED OR TRANS MITTED) IN OUTPUT BFR |
| | | | | C | | | |
| | | | | C | | | |
| | | | | C | | | |
| 688C | AEFD | 00FD | | | LI | #VT | |
| 688E | BD | 000D | | | STN | ACOUTBFR | |

TABLE VII

RFF SOURCE CODE

| LOC | OBJ | OP1 | OP2 | SOURCE STATEMENT | | | |
|---|---|---|---|---|---|---|---|
| | | | | | | .. THEN | |
| 4562 | A1B3 | 02B3 | | | STBL | FLAG3B | |
| | | | | | | ... STORE RFF CODE | |
| 4564 | AEF9 | 00F9 | | | LI | #RFF | |
| 4566 | BD | 000D | | ZRORTB | STN | ACOUTBFR | |
| | | | | | | ... ZERO # OF INDENT LEVELS ACTIVE | |
| 4567 | 25 | | | | CLA | | |
| 4568 | A19A | 029A | | | STBL | RTABNUMB | |

Table IV above shows LF code, Table V shows the EMF code, Table VI, the VT code, and Table VII, the RFF source code. The code for deleting universal text is omitted as being straight forward.

ROM TYPE TEXT PROCESSING

Figure 9:
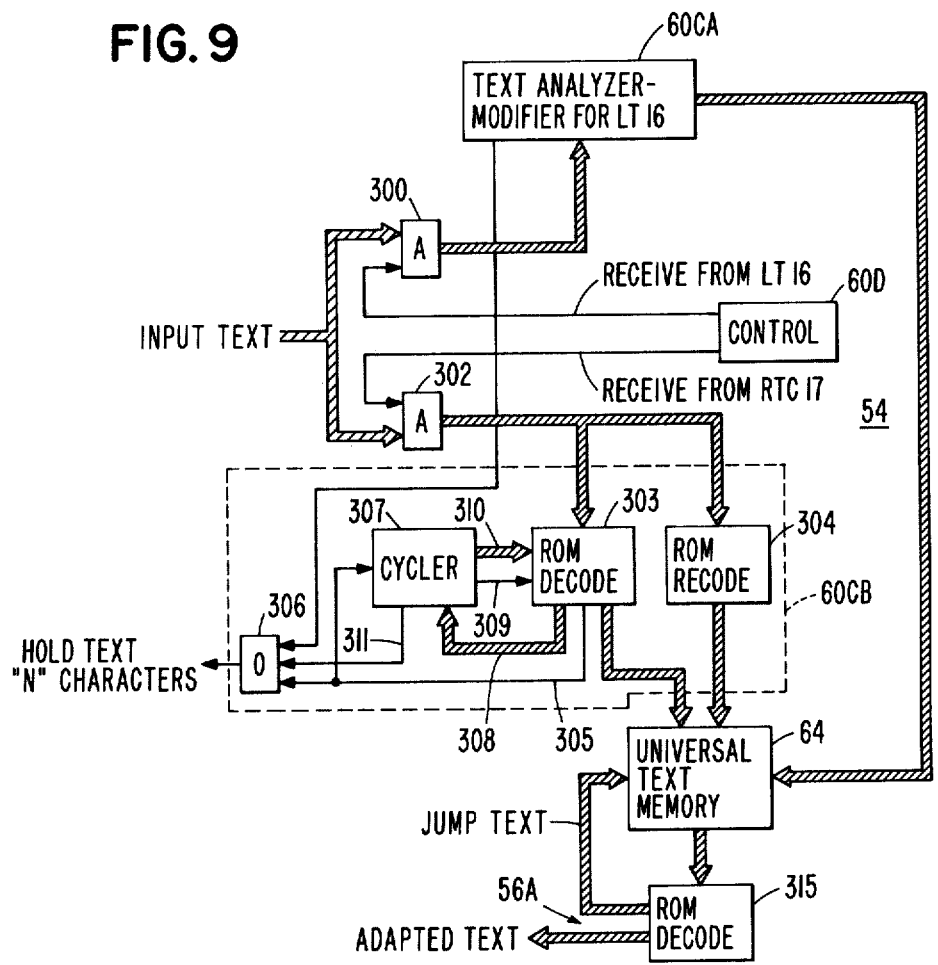
FIG. 9 is a logic flow diagram illustrating operation of the invention incorporated in a fixed logic system instead of a programmable system.

In FIG. 9, a ROM type of encode-decode usable with the FIG. 1B illustrated store and forward unit in the form of a copy production machine is shown. The input text is received from either LT 16 or RTC 17 via a buffer (not shown). A control 60D, which may be a computer program in SMP 62, selects a set of AND gates to receive text signals from either LT 16 or RTC 17 (FIG. 1), respectively, via AND circuits 300, 302. The received text signals are transmitted a character at a time to a pair of ROMs 303 and 304. ROM 304 takes the text signals and supplies adjusted encoded text or data signals to universal text or page memory 64. The control characters from RTC 17 are decoded in ROM 303. ROM decode 303 may contain one or more characters corresponding to each received RTC 17 control character. In the event additional control characters are to be added for the universal text, ROM decode 303 has a "hold-text" line 305 which supplies signals through OR circuit 306 to a buffer (not shown) for delaying text until the additional control characters can be suitably inserted in universal text memory 64. The line 305 signal also actuates cycler 307 for providing additional ROM cycles for reading out the additional control characters. ROM decode 303 also has a memory field supplying signals over cable 308 to cycler 307 indicating the number of additional characters to be cycled from ROM 303 to universal text memory 64. Cycler 307 supplies timed readout signal pulses over line 309 along with address information over cable 310 for reading out such additional character signals. That is, the field supplied over cable 308 not only includes the number of characters to be read out but also includes the beginning memory address of the first additional control character to be read out. Additionally, cycler 307 supplies a hold signal over line 311 until all additional characters had been read out of ROM 303. Upon removal of the hold signal from line 311, the buffer (not shown) continues to supply input text as aforedescribed. In this regard, it should be noted that universal text memory 64 also includes addressing circuitry which includes an addressing incrementer (not shown) so that the received text as modified by ROMs 303, 304 is in a contiguous portion of universal text memory 64. The transfer of the universal text process signals to NVS 19 is omitted for the purpose of brevity.

Text analyzer-modifier 60 CA for LT 16 operates identically to that just described for 60CB. The construction of ROMs 303, 304 are in accordance with normal and known ROM construction techniques wherein the signal contents of the ROMs are made in accordance with that indicated for Table I, supra.

From the above, it is seen that the text processing for the control character control requires an additional number of cycles than those required for pure transmission. In this regard, all text processing requires such additional cycles, thereby reducing throughput of a store and forward unit or a copy production machine.

The output portion of the ROM version of the invention for supplying adapted text is shown as unit 56A which includes a single ROM 315. The universal text memory 64 under control of SMP 62 supplies the universal text to ROM decode 315 one character at a time. ROM decode 315 is adapted for transmitting adapted text to one of the plurality of destinations, it being understood an additional ROM is provided for each destination. Each time a control character from the universal text is to be deleted, ROM decode 315 supplies a field of signals indicating the number of control characters to be deleted. For example, if one control character is to be deleted, ROM decode 315 supplies a jump next signal to universal text memory for eliminating the readout of the next control character. If five characters are to be deleted, the next five characters are not transmitted from memory 64, and so forth. Accordingly, the transmission of text from universal text memory 64 to the destination device will include a minimum number of cycles thereby maximizing throughput of the store and forward unit in the transmission mode. This elimination of text processing cycles is an important factor in providing maximum performance at minimum cost.

Examination of Table I will show that in some instances the first received control character from the universal text is to be deleted. In such an instance, ROM decode 315 is programmed to substitute the second character for the first control character and jump the second character even though that character is acceptable for the adapted text. For example, in the first line of Table I in going from the universal text control characters FHI CHI to printer text, the control character CHI is to be used. However, only one transmission character cycle is desired. Therefore, when ROM decode 315 is adapted for printer text transmission, the decode of FHI in ROM decode 315 causes output of CHI during that first cycle, plus jumping one character position for deleting the transmission of the CHI character from the universal text. The same procedure is used in connection with deletions of other control characters. In some instances the universal text may have a variable number of control characters for a given input character. In such a situation, the universal text includes a length field indicating the number of control characters. This length field is decoded by ROM decode 315 for determining the actual number of characters to be jumped in the universal text memory 64 output or transmitting mode.

While the invention has been particularly shown and described with reference to preferred embodiments thereof, it will be understood by those skilled in the art that various changes in form and details may be made therein without departing from the spirit and scope of the invention.

What is claimed is:

1. A method for operating a message store-and-forward unit, coupled to a plurality of connected units, at least one of said connected units using at least one different text processing character signals from those used by said store-and-forward unit, comprising the steps of:
   receiving a message from one of said connected units;
   processing said received message by the steps of comparing each text processing character received to text processing characters performing the same function in all other connected units, and
   inserting into said message all those text processing characters which perform the same function in all other connected units and which are different from the text processing character received; and
   transmitting the processed message to one of said connected units.

2. The invention as claimed in claim 1 wherein said transmitting step includes the step of:
   deleting from said message those text processing characters which differ from those performing the same function in the one of said connected units to which said message is being transmitted.

* * * * *